United States Patent
Oka et al.

(10) Patent No.: US 12,098,750 B2
(45) Date of Patent: Sep. 24, 2024

(54) SLIDING COMPONENTS

(71) Applicant: Eagle Industry Co., Ltd., Tokyo (JP)

(72) Inventors: Masao Oka, Tokyo (JP); Tsutomu Ikebe, Tokyo (JP); Masafumi Kato, Tokyo (JP); Shota Nishimura, Tokyo (JP); Yusuke Kunisaki, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 304 days.

(21) Appl. No.: 17/601,680

(22) PCT Filed: Apr. 7, 2020

(86) PCT No.: PCT/JP2020/015716
§ 371 (c)(1),
(2) Date: Oct. 5, 2021

(87) PCT Pub. No.: WO2020/209262
PCT Pub. Date: Oct. 15, 2020

(65) Prior Publication Data
US 2022/0170511 A1    Jun. 2, 2022

(30) Foreign Application Priority Data
Apr. 11, 2019 (JP) .................... 2019-075630

(51) Int. Cl.
*F16C 33/74* (2006.01)
*F16C 33/04* (2006.01)
*F16J 15/34* (2006.01)

(52) U.S. Cl.
CPC ............ *F16C 33/74* (2013.01); *F16C 33/043* (2013.01); *F16J 15/34* (2013.01); *F16C 2202/04* (2013.01);
(Continued)

(58) Field of Classification Search
CPC .... F16C 33/74; F16C 33/043; F16C 2202/04; F16C 2223/60; F16J 15/34
See application file for complete search history.

(56) References Cited

U.S. PATENT DOCUMENTS 7,090,919 B2    8/2006   Tomoto et al. ............ B32B 5/16
9,200,674 B2 *  12/2015  Satoji .................... F16C 33/723
(Continued)

FOREIGN PATENT DOCUMENTS

CN   1514152     7/2004    ............... F16J 15/16
CN   101365660   2/2009    ........... C04B 35/565
(Continued)

OTHER PUBLICATIONS

European Search Report issued in corresponding application 20787089.0, dated Nov. 11, 2022, 8 pages.
(Continued)

*Primary Examiner* — Eugene G Byrd
(74) *Attorney, Agent, or Firm* — HAYES SOLOWAY P.C.

(57) ABSTRACT

Provided is sliding components capable of stably obtaining a low-friction effect even in a non-lubricated environment. Sliding components and have sliding surfaces and performing relative sliding. A carbon film in which a polymer structure is dispersed is formed on the sliding surface of the sliding component. The proportion of the polymer structure dispersed in the carbon film is such that an extinction coefficient of 0.2 or less and a refractive index of 1.5 to 2.0 are satisfied in a wavelength range of 550 nm of spectroscopic ellipsometry.

8 Claims, 5 Drawing Sheets

(52) U.S. Cl.
CPC ...... *F16C 2206/60* (2013.01); *F16C 2223/60* (2013.01)

(56) References Cited

U.S. PATENT DOCUMENTS

| | | | | |
|---|---|---|---|---|
| 10,280,977 | B2 | 5/2019 | Itadani et al. | ........... F16J 15/34 |
| 10,487,944 | B2* | 11/2019 | Itadani | ................ F16J 15/3496 |
| 10,807,913 | B1* | 10/2020 | Hawks | ................... F16C 33/043 |
| 2002/0022129 | A1 | 2/2002 | Moronuki | ............... C23C 16/22 |
| 2010/0001220 | A1* | 1/2010 | McLean | ............... F16J 15/3468 |
| | | | | 29/890.12 |
| 2010/0061676 | A1 | 3/2010 | Sugiyama et al. | ...... F16C 33/12 |
| 2011/0285091 | A1* | 11/2011 | Wodrich | ................ B22D 19/08 |
| | | | | 277/377 |
| 2014/0314346 | A1* | 10/2014 | Thoma | ..................... F16J 15/30 |
| | | | | 384/16 |
| 2015/0061229 | A1* | 3/2015 | Ryther | ................. F16J 15/3224 |
| | | | | 277/375 |
| 2015/0368578 | A1 | 12/2015 | Woydt et al. | ......... C10M 103/04 |
| 2016/0082800 | A1* | 3/2016 | Sakairi | .................... F16C 17/10 |
| | | | | 384/297 |
| 2017/0146126 | A1* | 5/2017 | Hudson | ............... F16C 11/0666 |
| 2018/0112711 | A1* | 4/2018 | Itadani | ..................... C23C 16/26 |
| 2018/0187781 | A1* | 7/2018 | Moronuki | .................... F02F 5/00 |
| 2018/0216661 | A1* | 8/2018 | Gonzalez | ................ F16C 33/24 |
| 2018/0274585 | A1* | 9/2018 | Koketsu | .................. F16C 17/18 |
| 2019/0170257 | A1* | 6/2019 | Hosoe | ..................... F16C 33/22 |
| 2019/0178386 | A1* | 6/2019 | Arai | ........................ F16C 33/74 |
| 2019/0301528 | A1* | 10/2019 | Koike | .................... F16C 33/121 |
| 2020/0011407 | A1* | 1/2020 | Bair | ....................... F16C 17/02 |
| 2020/0013577 | A1* | 1/2020 | Hunt | ..................... F16C 33/109 |

FOREIGN PATENT DOCUMENTS

| | | | |
|---|---|---|---|
| CN | 101663495 | 3/2010 | ............. F16C 33/12 |
| CN | 105008576 | 10/2015 | ............. G23C 14/06 |
| CN | 107532723 | 1/2018 | ............. F16J 15/34 |
| EP | 2166258 | 3/2010 | ............. F16J 15/34 |
| JP | 2-158690 | 6/1990 | ........... C10M 109/02 |
| JP | 9-54996 | 2/1997 | ............. G11B 11/10 |
| JP | 2002-97573 | 4/2002 | ............. C23C 16/26 |
| JP | 2004-225725 | 8/2004 | ............. F16J 15/34 |
| JP | 2006-194282 | 7/2006 | ............. F16J 15/34 |
| JP | 2006-318535 | 11/2006 | ............. G11B 5/738 |
| JP | 2019-15309 | 1/2009 | ............. F16J 15/34 |
| JP | 2016204221 | 12/2016 | ........... C04B 35/565 |
| JP | 2017053435 A | * 3/2017 | ........... C23C 14/025 |
| WO | WO2008133197 | 11/2008 | ............. F16C 33/12 |

OTHER PUBLICATIONS

Chinese Official Action issued in corresponding application 202080026391.8, dated Nov. 2, 2022, 15 pages.
International Preliminary Report on Patentability issued in PCT/JP2020/015716, dated Oct. 21, 2021, 6 pages.
International Search Report and Written Opinion issued in PCT/JP2020/015716, dated Oct. 15, 2020, with English translation, 15 pages.
Chinese Official Action issued in corresponding application 202080026391.8, dated May 23, 2023, with English translation, 14 pages.
Chinese Official Action issued in corresponding application 202080026391.8, dated Sep. 25, 2023, 14 pages with translation.

* cited by examiner

SLIDING COMPONENTS

TECHNICAL FIELD

The present invention relates to sliding components sliding relative to each other and used for a shaft sealing device that shaft-seals a rotary shaft of a rotating machine in a seal field such as automotive and general industrial machinery or a bearing of a machine in a bearing field such as automotive and general industrial machinery.

BACKGROUND ART

A mechanical seal as an example of a shaft sealing device preventing sealing target fluid leakage includes a pair of annular sliding components rotating relative to each other and having sliding surfaces sliding with each other. For example, the sliding surface of the sliding component illustrated in Patent Citation 1 is covered with a diamond-like carbon coating (hereinafter, also referred to as a DLC coating in some cases). The friction coefficient of the DLC coating is much smaller than that of the sliding surface of a sliding component made of a hard material such as SiC. By, for example, the DLC coatings being slid relative to each other in a lubricated environment in which a liquid as a sealing target fluid is interposed between the sliding surfaces, a small friction coefficient of the sliding surface, which is a condition allowing the use of the mechanical seal, is exhibited and friction reduction is realized between the sliding surfaces.

By the way, although the mechanical seal may be used in a non-lubricated (dry) environment in which no liquid is interposed between the sliding surfaces, the friction coefficient of the DLC coating in the atmosphere is approximately 0.1 to 0.3 in general. Accordingly, in order to obtain a low-friction effect satisfying the condition allowing the use of the mechanical seal, for example, the hydrogen content of the DLC coating is increased, oxide ceramics or a metal acting as a catalyst is selected as the material of the sliding member on the other side performing relative sliding, and a PV value in a narrow range is selected as an operating condition. In this manner, a low-friction interface is formed between the sliding surfaces by transfer film formation and transfer film alteration caused by the wear debris of the DLC coating attributable to sliding being transferred to the sliding surface of the sliding member on the other side.

CITATION LIST

Patent Literature

Patent Citation 1: JP 2004-225725 A (Page 6, FIG. 2)

SUMMARY OF INVENTION

Technical Problem

However, it is complicated to set, for example, a high-PV value condition or the hydrogen content of the DLC coating required for the transfer film-based low-friction interface formation between the sliding surfaces in the non-lubricated environment. Besides, it is difficult to maintain the uniformity of the transfer film during the sliding. As a result, the low-friction interface between the sliding surfaces may become unstable, the friction of the sliding surface may fluctuate, and then it is difficult to stably obtain a low-friction effect, which has posed a problem.

The present invention has been made in view of such problems, and an object of the present invention is to provide sliding components capable of stably obtaining a low-friction effect even in a non-lubricated environment.

Solution to Problem

In order to solve the above problem, sliding components according to the present invention is sliding components having sliding surfaces sliding relative to each other, a carbon film in which a polymer structure is dispersed is formed on the sliding surface of one of the sliding components, and a proportion of the polymer structure dispersed in the carbon film is such that an extinction coefficient of 0.2 or less and a refractive index of 1.5 to 2.0 are satisfied in a wavelength range of 550 nm of spectroscopic ellipsometry. According to the aforesaid feature of the present invention, the proportion of the polymer structure dispersed in the carbon film formed on the sliding surface of the sliding component is such that an extinction coefficient of 0.2 or less and a refractive index of 1.5 to 2.0 are satisfied in a wavelength range of 550 nm of spectroscopic ellipsometry. Accordingly, the hardness of the carbon film is relatively low and chipped particles resulting from friction with the opponent sliding surface on the other side are reduced. In addition, since $\pi$ electrons are small in number, the chemical reactivity is low, and it is difficult for wear debris and the chipped particles to bond with each other, the wear debris and the chipped particles generated between the sliding surfaces are maintained in a fine state, no large particles attributable to bonding are generated, the friction being affected is suppressed by discharge from between the sliding surfaces to a surface dent or the outside, and a low-friction effect can be obtained. As described above, there is no need to form a transfer film by transferring the wear debris or the chipped particles of the carbon film attributable to sliding to the opponent sliding surface on the other side, and thus a low-friction effect can be stably obtained in a non-lubricated environment.

It may be preferable that the carbon film has a Vickers hardness of 2,500 HV or less. According to this preferable configuration, the carbon film is unlikely to wear, and thus a low-friction effect can be obtained for a long period of time.

It may be preferable that the sliding surface of remaining one of the sliding components is formed of silicon nitride. According to this preferable configuration, the wear debris and the chipped particles of the carbon film attributable to friction are unlikely to be transferred to the opponent sliding surface on the other side.

It may be preferable that an arithmetic mean roughness Ra on a surface of the carbon film may be 0.005 to 0.1 μm. According to this preferable configuration, the wear debris and the chipped particles generated between the sliding surfaces are collected with ease in the dent in the surface of the carbon film, and thus the wear debris and chipped particles are discharged from between the sliding surfaces and a low-friction effect is obtained with greater ease.

It may be preferable that the sliding components are a pair of seal rings of a mechanical seal. According to this preferable configuration, it is possible to obtain a low-friction effect satisfying a condition allowing the use of the mechanical seal in a non-lubricated environment.

DESCRIPTION OF EMBODIMENTS

A mode for implementing the sliding component according to the present invention will be described below based on an embodiment.

Embodiment

The sliding components according to the embodiment of the present invention will be described with reference to FIGS. 1 to 5. It should be noted that a mode in which the sliding component is a mechanical seal will be described as an example in the present embodiment. In addition, in the following description, the inner diameter side of the sliding component constituting the mechanical seal is an atmosphere A side (i.e., low-pressure side) as a leak side and the outer diameter side is a sealing target gas F side (i.e., high-pressure side) as a sealing target fluid side.

Figure 1:
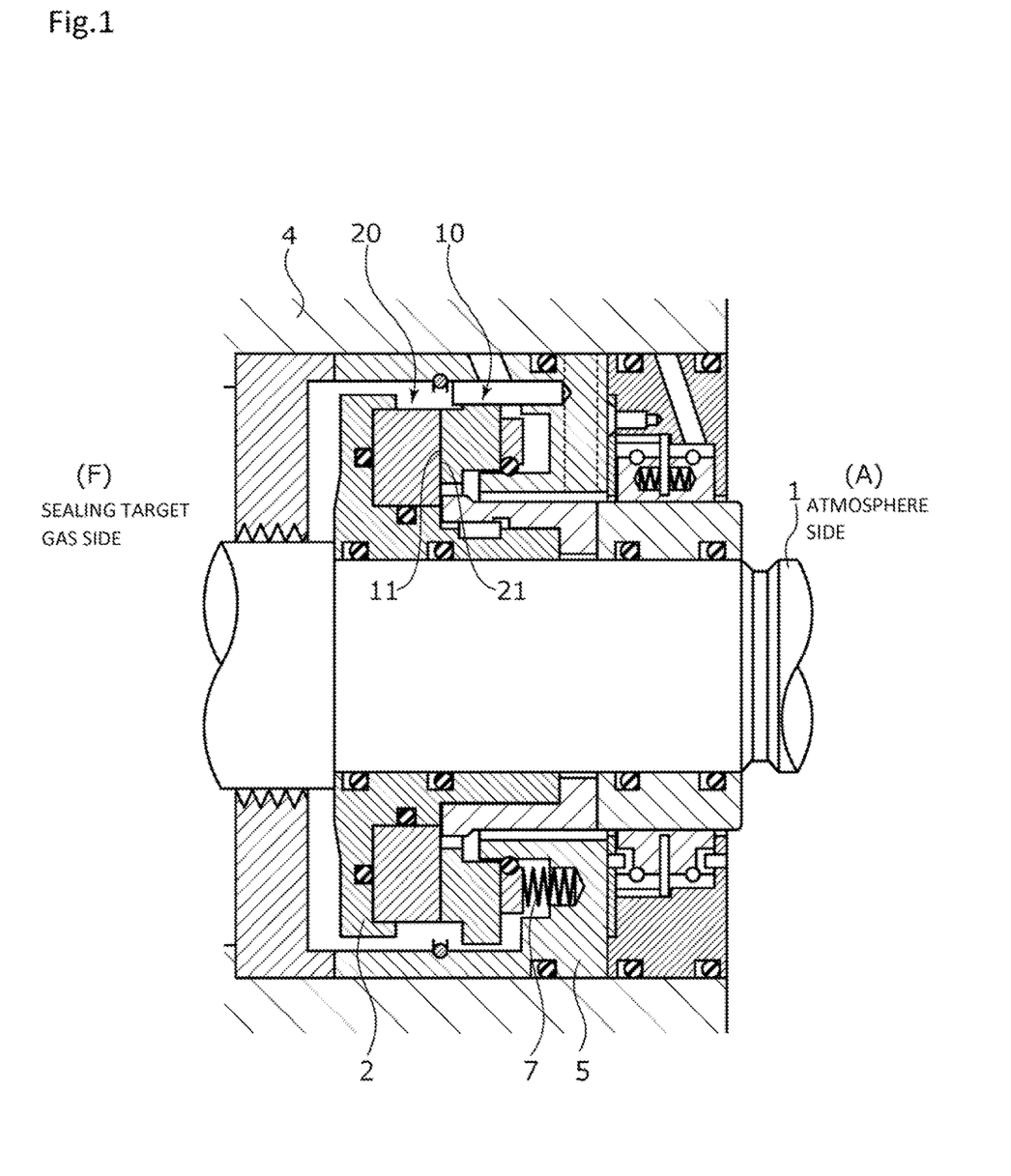
FIG. 1 is a vertical cross-sectional view illustrating an example of a mechanical seal including sliding components according to an embodiment of the present invention.

The mechanical seal for general industrial machinery illustrated in FIG. 1 is an inside-type mechanical seal that seals the sealing target gas F to leak from the outer diameter side toward the inner diameter side of a sliding surface in a non-lubricated (dry) environment in which no liquid is interposed between the sliding surfaces. The mechanical seal mainly includes an annular rotating seal ring 20, which is a sliding component provided on a rotary shaft 1 in a state of being rotatable together with the rotary shaft 1 via a sleeve 2, and an annular stationary seal ring 10, which is a sliding component provided on a seal cover 5 fixed to a housing 4 of an attachment target device in a non-rotating state and a state of being movable in the axial direction. A sliding surface 11 of the stationary seal ring 10 and a sliding surface 21 of the rotating seal ring 20 slide closely with each other by a spring 7 urging the stationary seal ring 10 in the axial direction.

The stationary seal ring 10 in the present embodiment is formed of silicon carbide (abbreviated to SiC), and the rotating seal ring 20 is formed of silicon nitride. It should be noted that at least the sliding surface 21 may be formed of silicon nitride as for the rotating seal ring 20.

Figure 2:
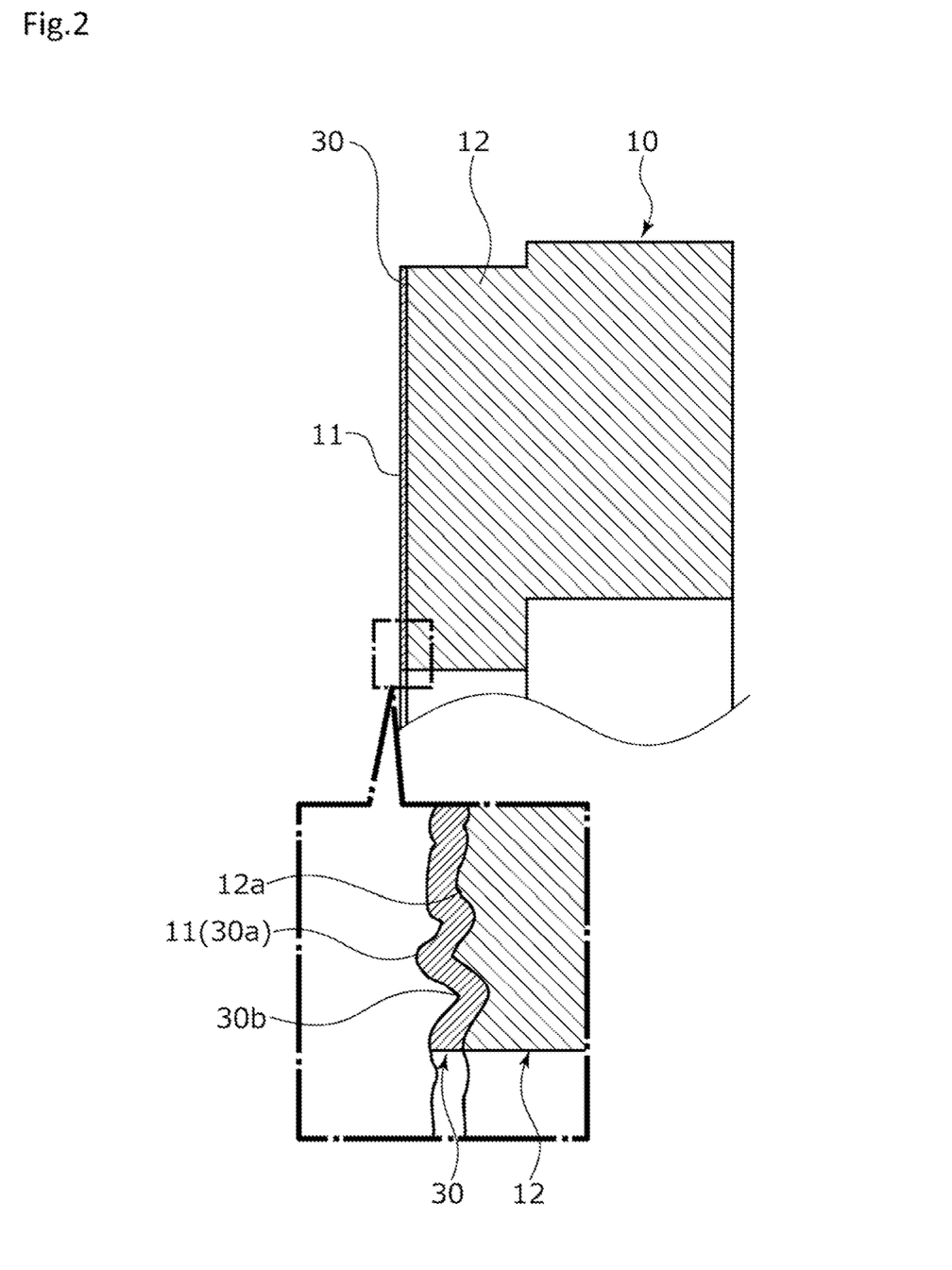
FIG. 2 is a cross-sectional view illustrating the sliding surface of a stationary seal ring on which a carbon film in the embodiment is formed.

As illustrated in FIG. 2, the stationary seal ring 10 has a carbon film 30 formed on the sliding surface 11. In other words, a surface 30a of the carbon film 30 constitutes the substantial sliding surface 11 of the stationary seal ring 10. It should be noted that the carbon film 30 in the present embodiment is a sort of diamond-like carbon coating in a broad sense and is a general term for thin films having an amorphous structure containing carbon as a main component and having carbon bonds of both graphite and diamond. In addition, in the present embodiment, no carbon film is formed on the sliding surface 21 of the rotating seal ring 20.

The carbon film 30 is formed such that one end surface portion 12a in the axial direction of a SiC base material 12 constituting the stationary seal ring 10 is covered by plasma chemical vapor deposition (abbreviated to CVD), ion beam deposition, or the like. It should be noted that the thickness of the carbon film 30 in the present embodiment is preferably in the range of $0.01 \times 10^{-6}$ m to $8 \times 10^{-6}$ m and more preferably in the range of $0.05 \times 10^{-6}$ m to $2 \times 10^{-6}$ m. As a result, wear and peeling of the carbon film 30 are suppressed.

In addition, the carbon film 30 is formed on the end surface portion 12a of the SiC base material 12 with a substantially uniform thickness. In other words, the carbon film 30 has a shape substantially along the waviness and fine unevenness in the end surface portion 12a of the SiC base material 12, and thus innumerable fine dents 30b are formed in the surface 30a of the carbon film 30 (see the enlarged part in FIG. 2). It should be noted that the fine dents 30b may be easily formed by an arithmetic mean roughness Ra on the surface 30a of the carbon film 30 being formed relatively coarsely in the range of 0.005 to 0.1 μm, which is a range of general mechanical seal use.

In addition, the carbon film 30 has a Vickers hardness of 2,500 HV or less and has a larger Vickers hardness value than the sliding surface 21 of the rotating seal ring 20. It should be noted that the Vickers hardness of the silicon nitride constituting the sliding surface 21 of the rotating seal ring 20 is approximately 1,400 HV. Accordingly, the wear of the carbon film 30 is suppressed by the Vickers hardness of the carbon film 30 being preferably in the range of 1,400 HV to 2,500 HV.

In addition, the carbon film 30 has a polymer structure dispersed therein. It should be noted that the degree of polymer structure dispersion in the carbon film can be determined by analyzing an extinction coefficient k and a refractive index n of the carbon film by spectroscopic ellipsometry.

The stationary seal rings 10 (Samples A to G) having the carbon film 30 in the present embodiment were prepared, and a Ring-on-Ring friction/wear test was conducted under the following conditions. The result of the test will be described below. It should be noted that the carbon film 30 of the stationary seal ring 10 is formed in a state where the thickness is uniform at $0.4 \times 10^6$ m. In addition, the rotating seal ring 20 lacks a carbon film as described above and at least the sliding surface 21 is formed of silicon nitride.

Surface pressure of sliding surface of stationary seal ring=0.03 MPa
Rotation speed of rotating seal ring=75 rpm
PV value=0.002 MPa·m/sec
Test time=up to sliding distance of 200 m
Sealing target fluid=nitrogen gas In addition, regarding the carbon film 30 of the stationary seal rings 10 (shown by Samples A to G describe later) in the present embodiment, the extinction coefficient k and the refractive index n of the carbon film 30 were analyzed in the wavelength range of 550 nm of spectroscopic ellipsometry by means of a spectroscopic ellipsometer (e.g., measuring device (RC2) manufactured by J. A. Woollam).

Table 1 shows the result of the analysis of the extinction coefficient k and the refractive index n of the carbon film 30 of the stationary seal rings 10 (Samples A to G) and the test result of the Ring-on-Ring friction/wear test in the present embodiment. Regarding the Ring-on-Ring friction/wear test, it should be noted that usability was determined based on whether or not a sliding surface friction coefficient of 0.05 or less, which is a condition allowing the use of the mechanical seal, was exhibited. Further, it should be noted that the formation or non-formation of a transfer film on the sliding surface 21 of the rotating seal ring 20 was confirmed after the Ring-on-Ring friction/wear test. As for the confirmation of the formation or non-formation of the transfer film, it was determined that no transfer film was formed on the sliding surface 21 of the rotating seal ring 20 with deposits removed by air blowing on the sliding surface 21 of the rotating seal ring 20 and the transfer film having an intra-contact range area ratio of 5% or less at a magnification of optical microscope 5×.

TABLE 1

| Sample | Extinction coefficient (k) | Refractive index (n) | Usability | Transfer film formation |
|---|---|---|---|---|
| A | 0.44 | 2.29 | x | Formed |
| B | 0.30 | 2.23 | x | Formed |
| C | 0.17 | 2.08 | o | Formed |
| D | 0.10 | 1.97 | o | Not formed |
| E | 0.05 | 1.91 | o | Not formed |
| F | 0.003 | 1.73 | o | Not formed |
| G | 0.0004 | 1.65 | o | Not formed |

Regarding the stationary seal rings 10 (Samples D, E, F, and G) in which the sliding surface friction coefficient of 0.05 or less as a condition allowing the use of the mechanical seal is exhibited and no transfer film is formed on the sliding surface 21 of the rotating seal ring 20, it was found that the stationary seal rings 10 (shown by Samples D, E, F, and G) have a degree of polymer structure dispersion with an extinction coefficient of 0.2 or less and a refractive index of 1.5 to 2.0 in the wavelength range of 550 nm of spectroscopic ellipsometry.

As described above, the sliding surface 11 of the stationary seal ring 10 according to the present invention has the carbon film 30 in which a polymer structure is dispersed and the carbon film 30 is characterized by having a refractive index of 1.5 to 2.0 in the wavelength range of 550 nm of spectroscopic ellipsometry, being lower in hardness than the high-hardness DLC coating classified into the ta-C region defined in JP 2010-281928 A, having an extinction coefficient of 0.2 or less, and having a small number of n electrons. Since the hardness is relatively low, wear debris P30 and chipped particles P31 (black particles in FIG. 3) resulting from friction with the sliding surface 21 of the rotating seal ring 20 on the other side are reduced. In addition, since the n electrons are small in number and the chemical reactivity is low, it is difficult for the wear debris P30 and the chipped particles P31 to bond with each other, and thus the wear debris P30 and the chipped particles P31 derived from the carbon film 30 and generated between the sliding surfaces 11 and 21 are maintained in a fine state, no large particles attributable to bonding are generated, the friction being affected is suppressed by discharge from between the sliding surfaces 11 and 21 to the surface dent (such as the dent 30b formed in the surface 30a of the carbon film 30) or the atmosphere A side, and a low-friction effect can be obtained. It should be noted that wear debris P20 (white particles in FIG. 3) derived from the sliding surface 21 of the rotating seal ring 20 and generated between the sliding surfaces 11 and 21 is also unlikely to bond with the wear debris P30 and the chipped particles P31 derived from the carbon film 30. Accordingly, the wear debris P20, the wear debris P30, and the chipped particles P31 are likely to be maintained in a fine state.

Figure 3:
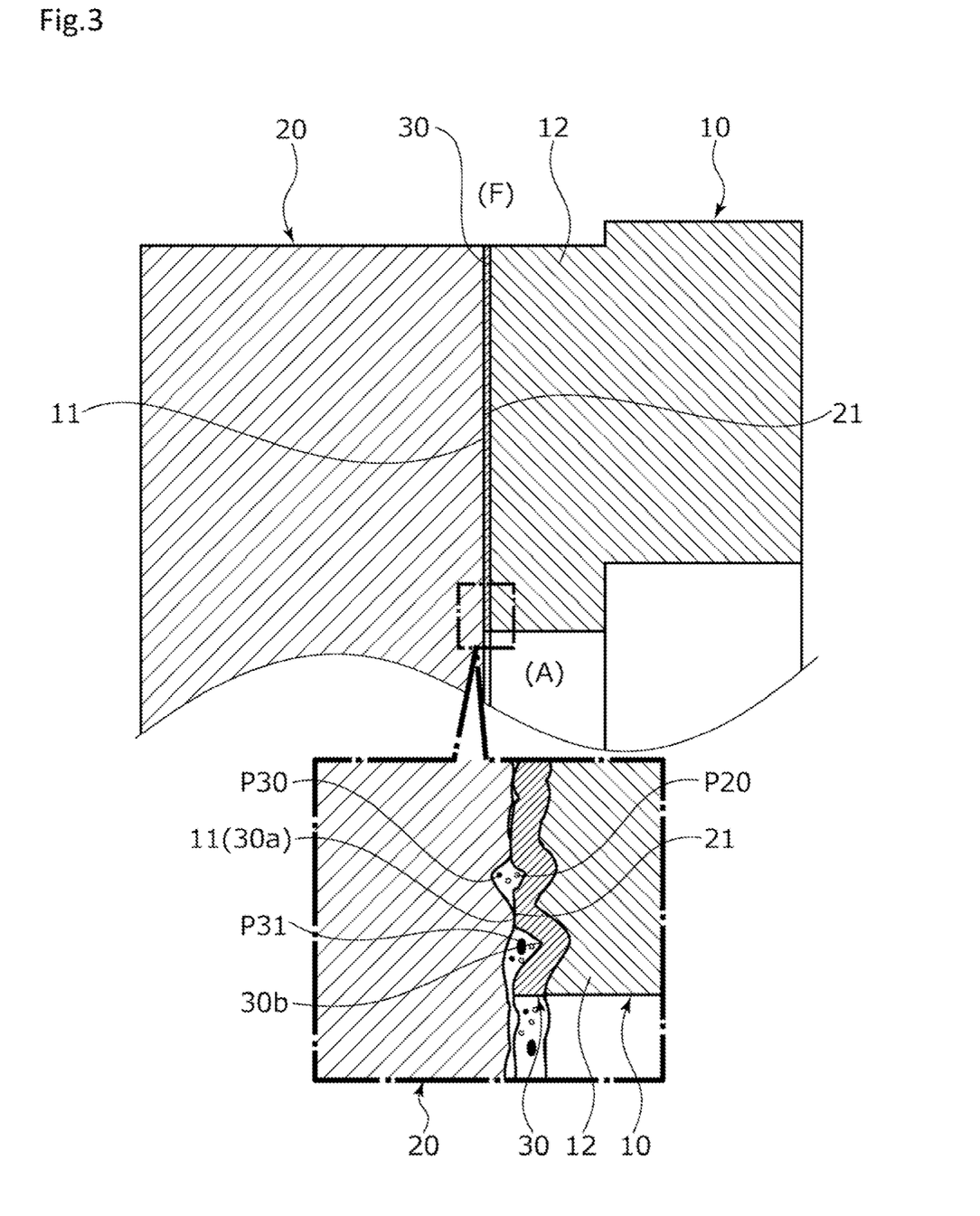
FIG. 3 is a cross-sectional view illustrating a state where the sliding surface of the stationary seal ring on which the carbon film in the embodiment is formed and the sliding surface of a rotating seal ring are in contact with each other.

As described above, there is no need to form a transfer film by transferring the wear debris P30 of the carbon film 30 attributable to sliding to the sliding surface 21 of the rotating seal ring 20, and thus a low-friction effect can be stably obtained in a non-lubricated environment.

In addition, since the sliding surface 21 of the rotating seal ring 20 is formed of low-friction and non-magnetic silicon nitride, the wear debris P30 and the chipped particles P31 derived from the carbon film 30 and attributable to friction are unlikely to be transferred to the sliding surface 21. It should be noted that the material of the sliding surface 21 of the rotating seal ring 20 is not limited to silicon nitride and may be, for example, SUS, SiC, $Al_2O_3$, $ZrO_2$, Ti, or a titanium alloy with reduced friction.

Since the surface 30a of the carbon film 30 is formed relatively coarsely in the range of the arithmetic mean roughness Ra of 0.005 to 0.1 μm, the innumerable fine dents 30b are formed with ease. Accordingly, the wear debris P20, the wear debris P30, and the chipped particles P31 generated between the sliding surfaces 11 and 21 are collected with ease, and thus the wear debris P20, the wear debris P30, and chipped particles P31 are discharged from between the sliding surfaces 11 and 21 even on the sealing target gas F side away from the atmosphere A side and a low-friction effect is obtained with greater ease.

Figure 4:
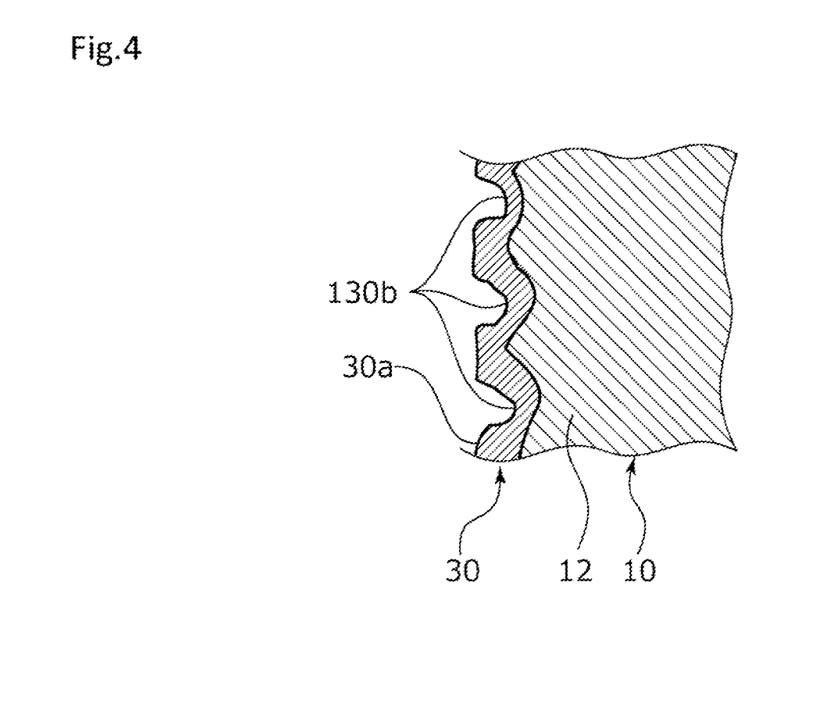
FIG. 4 is an enlarged cross-sectional view illustrating a modification example of the carbon film in the embodiment.

It should be noted that a modification example of the carbon film 30 is illustrated in FIG. 4 and a plurality of dents 130b having a predetermined size may be formed by laser machining with respect to the surface 30a of the carbon film 30 formed by plasma CVD, ion beam deposition, or the like as illustrated in FIG. 4. In addition, the rotating seal ring 20 may have a structure having a large number of dents in the sliding surface 21 by, for example, being made of porous SiC.

In addition, since the carbon film 30 is unlikely to wear by having a Vickers hardness of 2,500 HV or less, a low-friction effect can be obtained for a long period of time.

Figure 5:
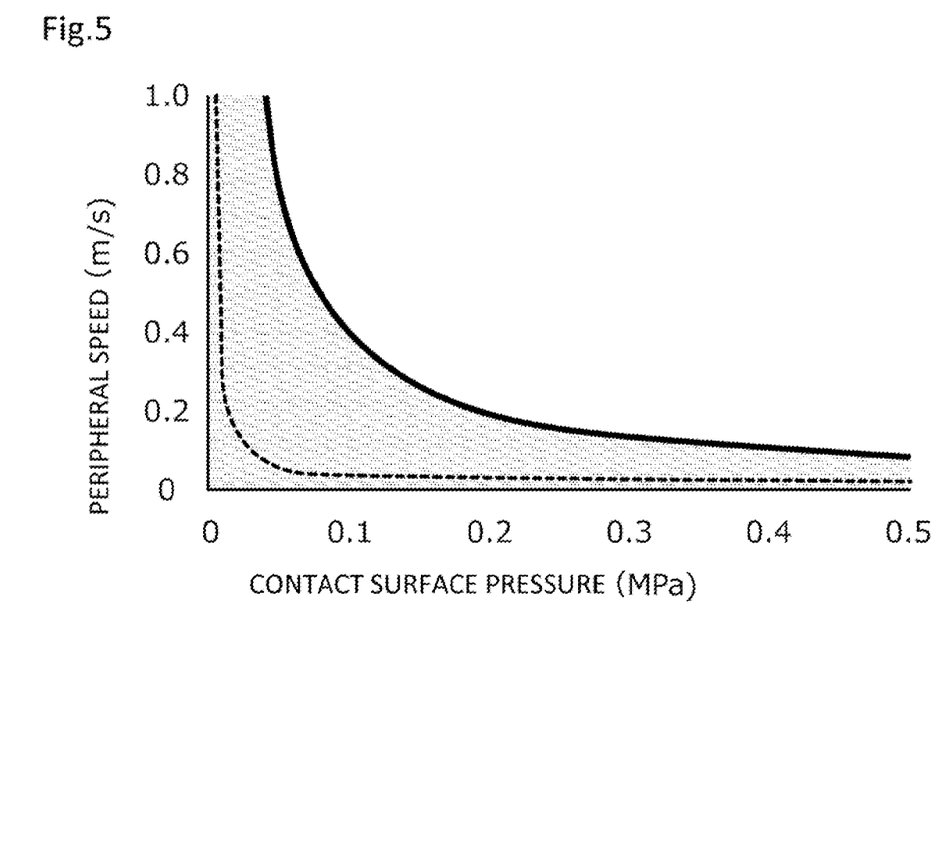
FIG. 5 is a graph showing the exhibition of a low-friction effect with respect to a PV value on the sliding surface of the stationary seal ring on which the carbon film in the embodiment is formed.

In addition, as for the carbon film 30 of the present embodiment, the exhibition of a friction coefficient of 0.01 or less with respect to the PV value derived from the product of the peripheral speed and the contact surface pressure of the sliding surface is wider in range (e.g., range indicated by hatching) than the DLC coating of the related art indicated by the dotted line as illustrated in FIG. 5. Accordingly, it is possible to expand the range allowing the use of the mechanical seal, PV value setting can be facilitated, and thus a low-friction effect can be stably obtained.

Although an embodiment of the present invention has been described above with reference to the drawings, the specific configurations are not limited to the embodiment and any changes or additions within the scope of the present invention are included in the present invention.

For example, although the mechanical seal for general industrial machinery has been described as an example of the sliding component in the above embodiment, the mechanical seal may be replaced with another mechanical seal for an automobile, a water pump, or the like. In addition, the present invention is not limited to the mechanical seal and may be a sliding component other than a mechanical seal, examples of which include a slide bearing.

In addition, although the mechanical seal to which the sliding component is applied is used in a non-lubricated environment in the above embodiment, the present invention is not limited thereto and it may be used in a lubricated environment in which a liquid as a sealing target fluid is interposed between the sliding surfaces.

In addition, although an example in which the carbon film 30 is provided only on the stationary seal ring 10 has been described in the above embodiment, the carbon film 30 may be provided only on the rotating seal ring 20 or may be provided on both the rotating seal ring 20 and the stationary seal ring 10.

In addition, although the stationary seal ring 10 is formed of SiC and the rotating seal ring 20 is formed of silicon nitride in the above embodiment, the present invention is not limited thereto and any sliding material can be applied insofar as it is used as a sliding material for a mechanical seal. It should be noted that the SiC may include a sintered body using boron, aluminum, carbon, or the like as a sintering aid and a material made of two or more types of phases having different components and compositions, examples of which include SiC in which graphite particles are dispersed and reaction-sintered SiC made of SiC and Si. In addition to the above sliding materials, a metal material, a resin material, a composite material, and the like can also be applied.

REFERENCE SIGNS LIST

10 Stationary seal ring (sliding component)
11 Sliding surface
12 SiC base material
12a End surface portion
20 Rotating seal ring (sliding component)
21 Sliding surface
30 Carbon film
30a Surface
30b Dent
130b Dent
P20, P30 Wear debris
P31 Chipped particles

The invention claimed is:

1. A mechanical seal comprising a pair of sliding components disposed between a sealed fluid side and a leakage side and configured to prevent a sealed fluid from leaking to the leakage side by causing sliding surfaces of the sliding components to relatively slide to each other in an environment including a non-lubricated environment,
   wherein a carbon film in which a polymer structure is dispersed is formed on the sliding surface of one of the sliding components, and
   a proportion of the polymer structure dispersed in the carbon film is such that an extinction coefficient of 0.2 or less and a refractive index of 1.5 to 2.0 are satisfied in a wavelength range of 550 nm of spectroscopic ellipsometry,
   a surface of the carbon film is provided with dents,
   the carbon film formed in the one of the sliding components is brought into direct contact with and relatively slide to the sliding surface of remaining one of the sliding components, and
   the remaining one of the sliding components is made of silicon nitride or silicon carbide.

2. The mechanical seal according to claim 1, wherein the carbon film has a Vickers hardness of 2,500 HV or less.

3. The mechanical seal according to claim 1, wherein an arithmetic mean roughness Ra on a surface of the carbon film is 0.005 to 0.1 μm.

4. The mechanical seal according to claim 1, wherein the sliding components are a pair of seal rings of a mechanical seal.

5. The mechanical seal according to claim 2, wherein the sliding surface of the remaining one of the sliding components is formed of silicon nitride.

6. The mechanical seal according to claim 2, wherein an arithmetic mean roughness Ra on a surface of the carbon film is 0.005 to 0.1 μm.

7. The mechanical seal according to claim 2, wherein the sliding components are a pair of seal rings of a mechanical seal.

8. The mechanical seal according to claim 3, wherein the sliding components are a pair of seal rings of a mechanical seal.

* * * * *